United States Patent [19]

Takewaki

[11] Patent Number: 5,644,701
[45] Date of Patent: Jul. 1, 1997

[54] DATA PROCESSING SYSTEM AND METHOD FOR EXECUTING SNAPSHOT DUMPS

[75] Inventor: Toshiaki Takewaki, Tokyo, Japan

[73] Assignee: Kabushiki Kaisha Toshiba, Kawasaki, Japan

[21] Appl. No.: 365,545

[22] Filed: Dec. 28, 1994

[30] Foreign Application Priority Data

Dec. 29, 1993 [JP] Japan ................................. 5-349616

[51] Int. Cl.$^6$ ........................................................ G06F 1/00
[52] U.S. Cl. ........................................ 395/182.18; 395/471
[58] Field of Search .......................... 395/182.18, 182.17, 395/182.13, 181, 471, 473, 469, 470

[56] References Cited

U.S. PATENT DOCUMENTS

| | | | |
|---|---|---|---|
| 4,665,520 | 5/1987 | Strom et al. | 395/182.13 |
| 4,819,154 | 4/1989 | Stiffler et al. | 395/182.18 |
| 5,065,311 | 11/1991 | Masai et al. | 395/182.18 |
| 5,280,611 | 1/1994 | Mohan et al. | 395/182.18 |
| 5,369,757 | 11/1994 | Spiro et al. | 395/182.17 |
| 5,404,504 | 4/1995 | Warner et al. | 395/182.18 |
| 5,454,099 | 9/1995 | Myers et al. | 395/182.18 |
| 5,455,946 | 10/1995 | Mohan et al. | 395/182.18 |
| 5,485,608 | 1/1996 | Lomet et al. | 395/182.18 |

FOREIGN PATENT DOCUMENTS

| | | | |
|---|---|---|---|
| 6-28315 | 2/1994 | Japan | G06F 15/00 |

OTHER PUBLICATIONS

Wu et al., "Error Recovery in Shared Memory Multiprocessors Using Private Caches", IEEE Trans. on Parallel and Distributed systems, vol. 1, Iss. 2 Apr. 1990.

Pilarski et al., "Checkpointing for Distributed Databases: Starting From the Basics", IEEE Trans. on Parallel and Distributed Systems, vol. 3, Iss. 5 Sep. 1992.

Crus et al., "Incremental Database Log Image Copy", IBM TDB vol. 25, No. 7b Dec. 1982.

*Primary Examiner*—Robert W. Beausoliel, Jr.
*Assistant Examiner*—Joseph E. Palys
*Attorney, Agent, or Firm*—Finnegan, Henderson, Farabow, Garrett & Dunner, L.L.P.

[57] ABSTRACT

At the time of a snapshot dump, a main memory storage unit stores only the memory contents of the dirty ones whose contents have changed of the pages in the main memory after the execution of the preceding snapshot dump. Data indicating the storage location of the contents of the pages stored at that time is stored in a storage device in pages in the form of a storage location list. Furthermore, data indicating the storage location of page contents is stored in a storage location list storage area each time a snapshot dump is executed. When the memory contents of a given snapshot dump are restored, the corresponding location list is taken out from the storage location list storage area. According to the storage location list, the corresponding memory contents are restored into the original page location in the main memory.

7 Claims, 10 Drawing Sheets

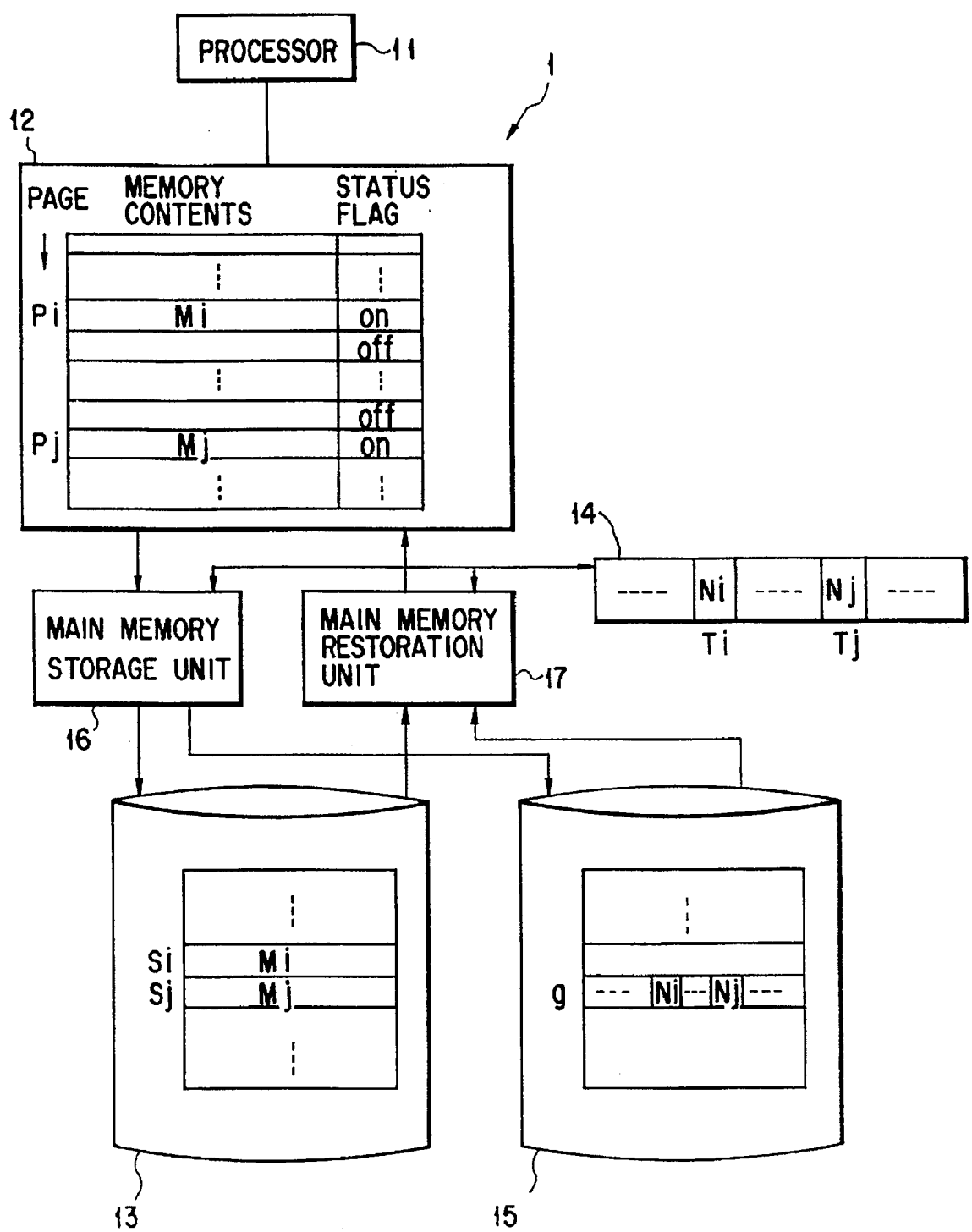
F I G. 1

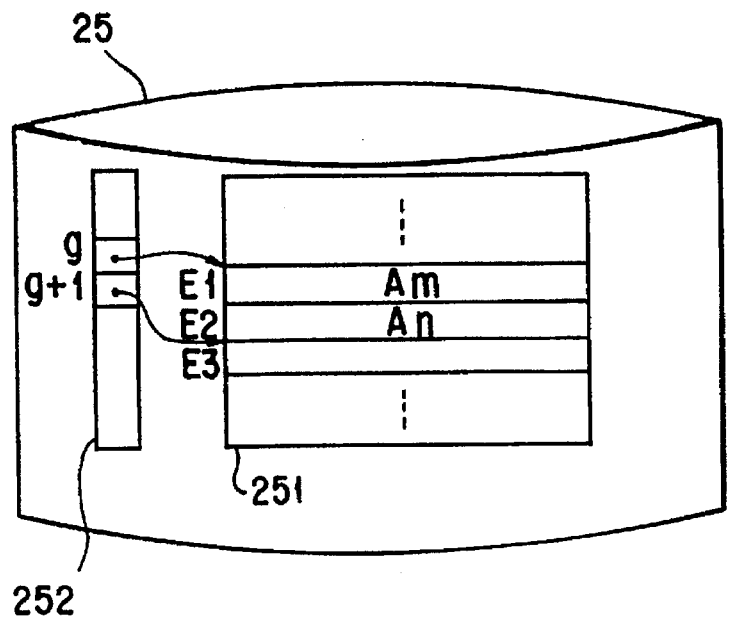
F I G. 3
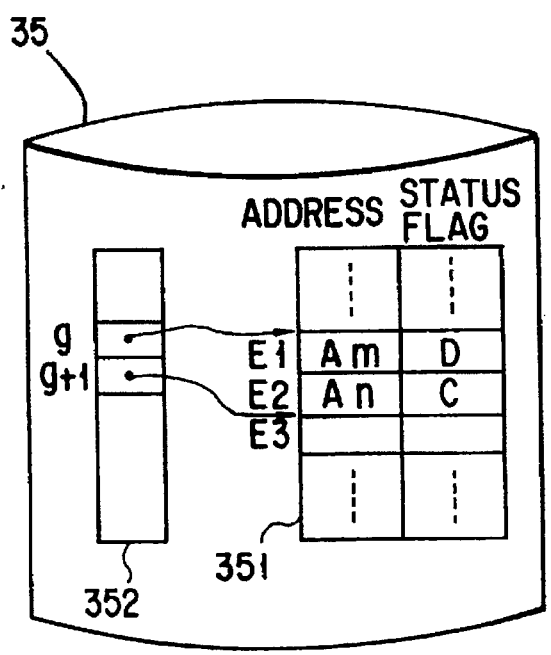
F I G. 5

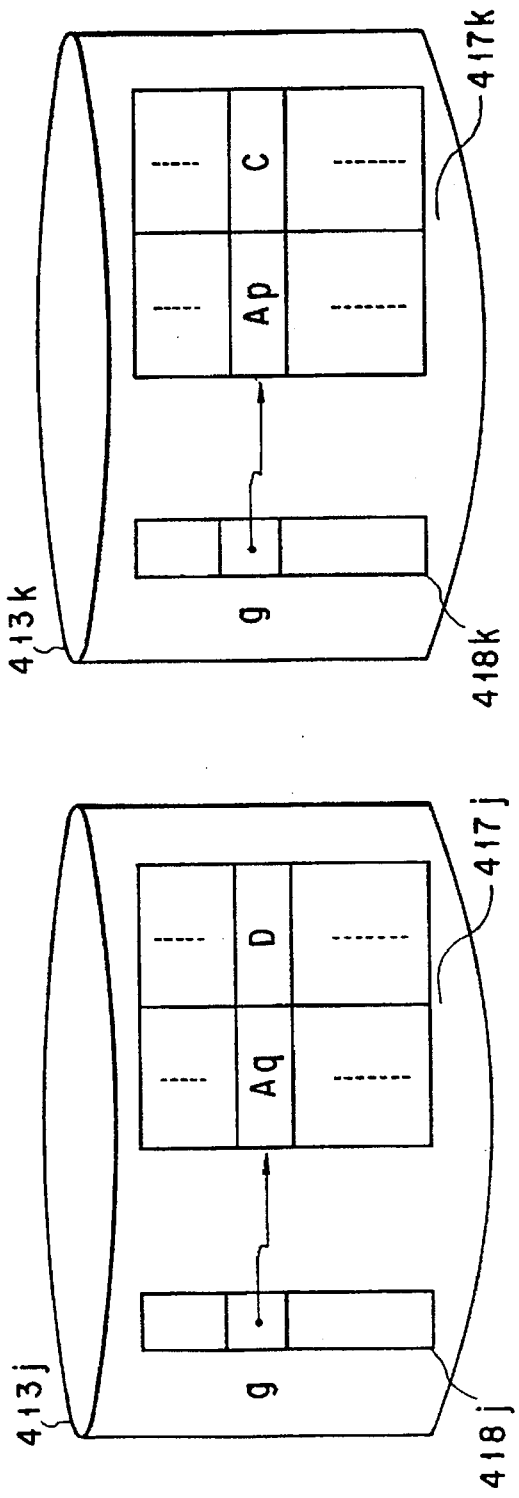

| ADDRESS | MEMORY CONTENTS | STATUS FLAG | WRITTEN-BACK FLAG |
|---|---|---|---|
| ---- | ---- | ---- | ---- |
| Bq | Aq | Cq | D | off |
| ---- | ---- | ---- | -------- |

| ADDRESS | MEMORY CONTENTS | STATUS FLAG | WRITTEN-BACK FLAG |
|---|---|---|---|
| ---- | ---- | ---- | ---- |
| Bp | Ap | Cp | C | off |
| ---- | ---- | ---- | ---- |
| Bq | Aq | Cq | D | off |
| ---- | ---- | ---- | ---- |

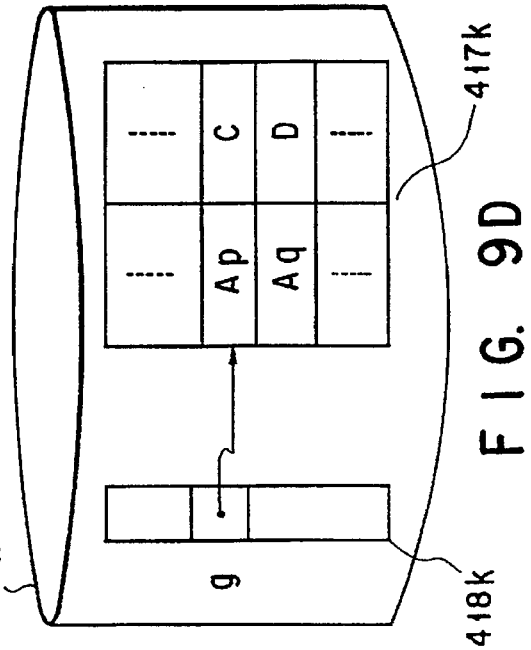
FIG. 9B
FIG. 9D
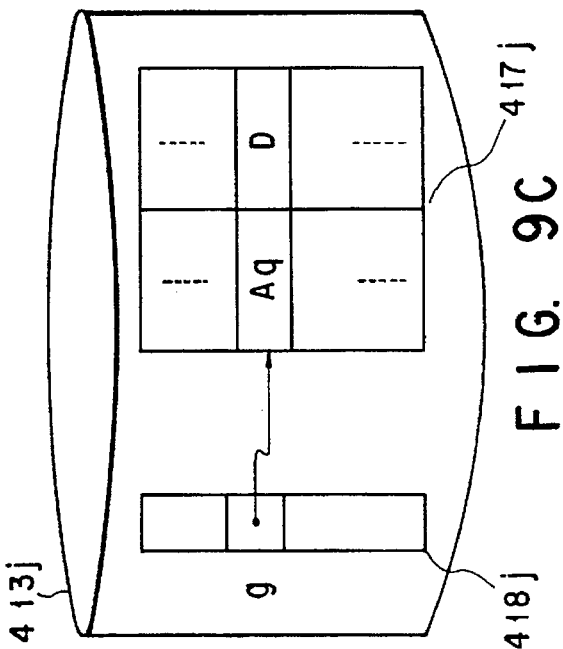
FIG. 9A
FIG. 9C

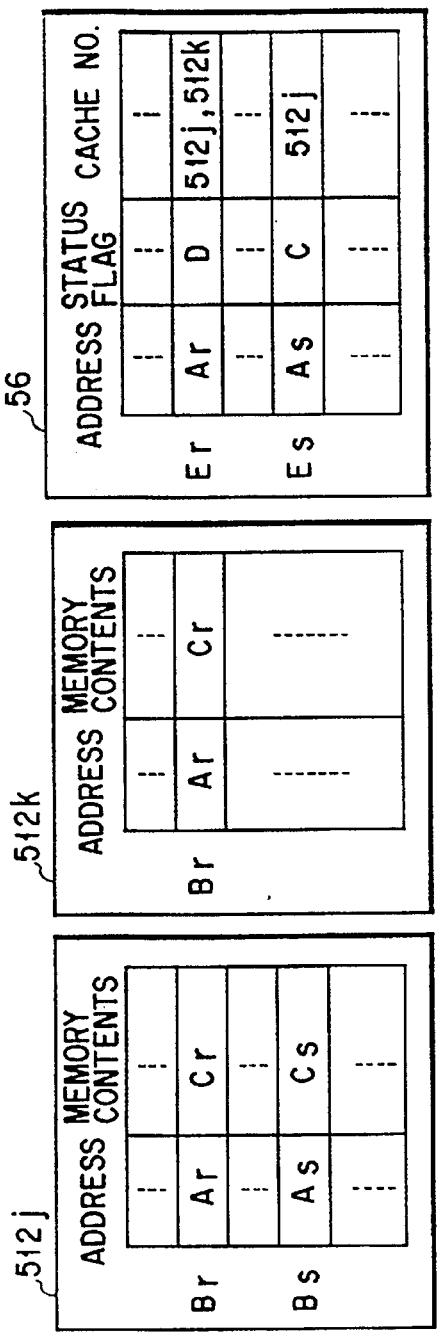
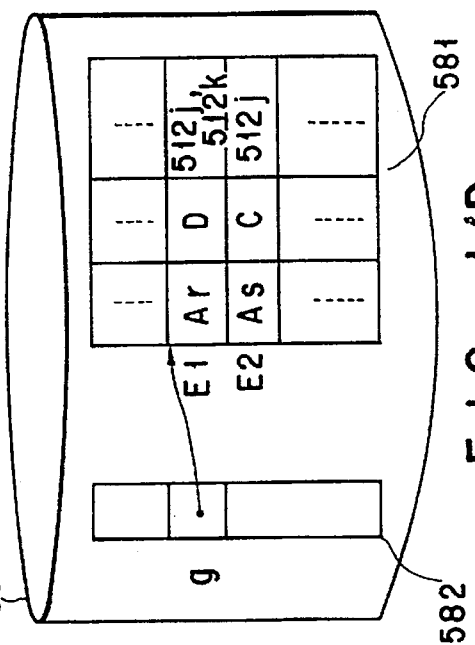
FIG. 11A  
FIG. 11B  
FIG. 11C  
FIG. 11D

DATA PROCESSING SYSTEM AND METHOD FOR EXECUTING SNAPSHOT DUMPS

BACKGROUND OF THE INVENTION

1. Field of the Invention

This invention relates to a data processing system and method for executing snapshot dumps, and more particularly to a data processing system and method for executing snapshot dumps in which the state of the program running at a given point in time is re-created by storing memory contents in a memory at regular intervals and restoring the memory contents as needed.

2. Description of the Related Art

When a failure has developed in the data processing unit while the user (or the developer) is executing a program on the data processing unit, he sometimes has to return the program to a certain point in time and re-create the condition. To re-create the condition at a certain point in time of the program, a method generally uses the approach of taking all of the memory contents stored in the memory at regular intervals in the course of executing the program and storing them in a different memory device. In general, this method is called a snapshot dump. When recreation of the program is needed, the state of the program existed at the desired point in time are restored on the basis of the memory contents stored in the different memory device.

As mentioned above, the conventional data processing system and method for executing snapshot dumps has been designed on the basis of the idea of simply re-creating the desired point in the program when a failure has occurred in the course of executing the program, and restarting the program at that point. It should be noted that the program after the restart does not necessarily re-create the same process as that done before the restart.

Moreover, in case of executing snapshot dumps for the program performing transaction processing, it is merely needed to re-create the state of the program on the basis of memory contents stored as a result of the last execution of the snapshot dump in the different memory device. Thus, it is sufficient that the different memory device for storing memory contents may have a memory capacity required for one of the snapshot dumps and the volume of memory contents does not become tremendous.

When the program is of the sequential processing type, there is no problem because even if the program is restarted at a certain point in time, the processing of the program is the same as that before the restart (i.e., because the sequential program has a deterministic execution behavior). However, for example, if the program is of the parallel processing type, not the sequential processing type, there may be a case where the processing of the program after the restart differs from that before the restart, because a program is influenced by a change in another program (i.e., because the sequential program has a nondeterministic execution behavior). Additionally, for example, when a program of the nonsequential processing type is debugged, it is necessary to execute snapshot dumps at regular intervals and store a tremendous volume of data. Consequently, a storage medium that can store enormous amounts of data is required. To re-create the state at the desired point in time of the program, memory contents stored in the different storage device must be loaded into the memory, so that the speed of re-creation cannot be increased. Since all of the memory contents are stored, it takes much time to load the memory contents into the memory when each of the snapshot dumps is executed.

Furthermore, with a data processing device with a cache memory, only snapshot dumps of the main memory are executed without executing snapshot dumps of the main memory. In such a data processing device, a problem arises: the behavior of the cache memory in executing snapshot dumps differs from that when not executing snapshot dumps. When the program is of the sequential processing type, there is no change in operation in accordance with the presence of the cache memory in the data processing device in which the above program is executed. For this reason, in a conventional data processing device, after the memory contents in the cache memory are written back into the main memory, only snapshot dumps for memory contents of the main memory are executed.

However, the program is of the nonsequential processing type causes a problem: a change in the behavior of the cache memory leads to a change in the behavior of the entire system. That is, by executing snapshot dumps, the execution of the program can be restarted even if the behavior of the cache memory has changed, but the processing after the restart of the program can differ from the previous processing. For example, in a debugging operation, the instruction code executed in execution of a snapshot dump differs from that in no execution of a snapshot dump. This means that bugs may surface under specific conditions.

SUMMARY OF THE INVENTION

An object of the present invention is to provide a data processing system and method for executing snapshot dumps, which are capable of re-creating, at high speed, the state of a program being executed at any point in time.

Another object of the present invention is to provide a data processing system and method for executing snapshot dumps, which enable the program restarted at any point in time to re-create the same process as the normal process done before the restart.

Still another object of the present invention is to provide a data processing system and method for executing snapshot dumps, which enable the program restarted at a given point in time to execute its original process reliably.

The foregoing objects are accomplished by providing a data processing system with a main memory that stores data in pages, comprising: storage means used for memory dumps of the main memory; and means for executing snapshot dumps in a constant period including: means for storing into the storage means memory contents of the main memory changed during the time between a preceding snapshot dump execution and a current snapshot dump execution.

With the arrangement, the state of the program running at a given point in time is re-created at high speed, and the program restarted at the given time executes the same process as the normal process done before the restart.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram of a data processing system for executing snapshot dumps according to a first embodiment of the present invention;

FIG. 3 shows how addresses are stored in the address storage area in the second embodiment of FIG. 2;

FIG. 5 shows how addresses and status flags are stored in the address storage area in the third embodiment of FIG. 4;

FIGS. 7A and 7B illustrate, in detail, the internal state of the cache memory in the fourth embodiment of FIG. 6;

FIGS. 7C and 7D illustrate, in detail, how addresses and status flags are stored in the cache data storage area in the fourth embodiment of FIG. 6;

FIGS. 8A and 8B illustrate another internal state of the cache memory in the fourth embodiment of FIG. 6;

FIGS. 9A and 9B show the memory state different from FIGS. 7A and 7B in detail;

FIGS. 9C and 9D show the storage state different from FIGS. 7C and 7D;

FIGS. 11A and 11B show the internal state of the cache memory in the fifth embodiment of FIG. 10;

FIG. 11C shows in detail how addresses, status flags, and cache numbers are memorized in the directory in the fifth embodiment of FIG. 10; and FIG. 11D shows in detail how addresses, status flags, and cache numbers are stored in the cache data storage area in the fifth embodiment of FIG. 10.

DETAILED DESCRIPTION OF THE PREFERRED EMBODIMENTS

Figure 2:
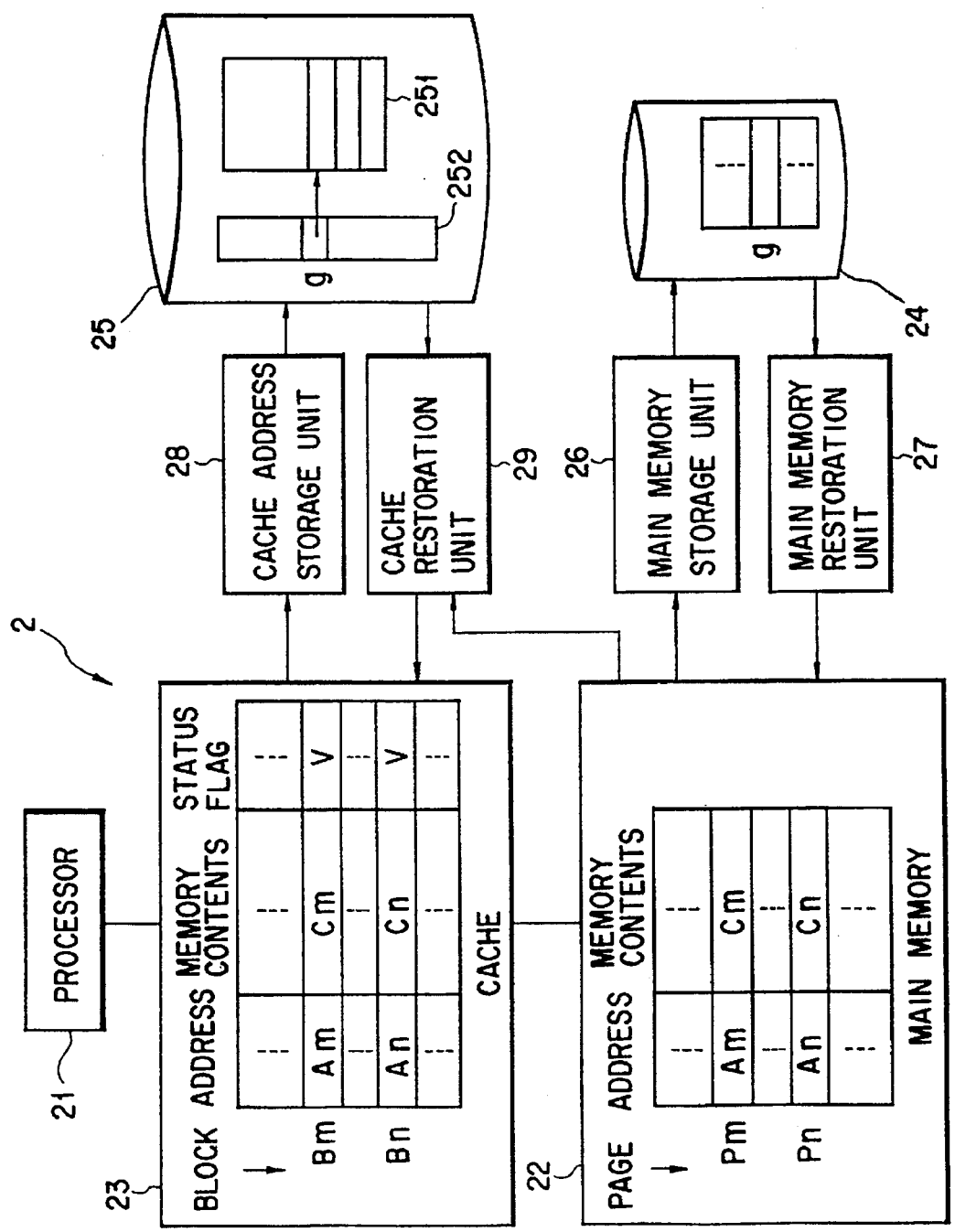
FIG. 2 is a block diagram of a data processing system for executing snapshot dumps according to a second embodiment of the present invention.

Hereinafter, referring to the accompanying drawings, embodiments of the present invention will be explained.

FIG. 1 shows the structure of a data processing system for executing snapshot dumps according to a first embodiment of the present invention.

As shown in FIG. 1, a data processing system for executing snapshot dumps 1 contains a processor 11 and a main memory 12. The processor 11 executes various programs. The main memory 12 stores programs to be executed by the processor 11. What is stored in the main memory 12 is managed in pages. The contents of memory of each page changes as the program is executed. Each page in the main memory 12 is assigned a status flag. Each status flag indicates whether or not the contents of the corresponding page have been changed after an execution of the preceding snapshot dump. If they have been changed, the flag is set on. When the next snapshot dump is executed, the on state is canceled to an off state.

The data processing system for executing snapshot dumps 1 contains a main memory storage area 13, a storage location list 14, and storage location list storage area 15. The main memory storage area 13 and storage location list storage area 15 are stored in an external nonvolatile memory device (e.g., a hard disk drive). The storage location list 14 is stored in a register.

The main memory storage area 13 stores the changed memory contents in the main memory 12 in pages. The main memory storage area 13 stores the changed memory contents one after another each time a snapshot dump is executed. The storage location list 14 stores information indicating which page in the main memory 12 has its contents changed, and where the changed memory contents are stored in the main memory storage area 13. Specifically, the storage location list 14 contains the areas corresponding to the individual pages in the main memory 12, and stores data indicating the location in which the memory contents (what has been stored when the last snapshot dump is executed) in the main storage area 13 are memorized. The data in the storage location list 14 is rewritten each time a snapshot dump is executed. The storage location list storage area 15 stores memory contents of the storage location list 14 for each snapshot dump execution. Specifically, the storage location list storage area 15 has a plurality of entries used to store the memory contents of the storage location list 14 for each snapshot dump execution.

The data processing system for executing snapshot dumps further contains a main memory storage unit 16 and a main memory restoration unit 17. The main memory storage unit 16 stores the contents of the main memory 12 in the main memory storage area 13 on the basis of a status flag indicating an on state. Referring to the status flag in the main memory 12, the main memory storage unit 16 also searches for pages whose contents have been changed. Furthermore, the main memory storage unit 16 puts information indicating the location of the memory contents in the main memory storage area 13 in the storage location list 14, and also stores the contents of the storage location list 14 in the storage location list storage area 15. The main memory restoration unit 17 restores the memory contents stored in the main memory storage area 13 into the main memory 12 on the basis of a column of the storage location lists stored in the storage location list storage area 15.

Hereinafter, the operation of executing snapshot dumps in the first embodiment will be described.

A case where the g-th snapshot dump is executed will be considered. When a snapshot dump is executed, the main memory storage unit 16 is started. First, the main memory storage unit 16 searches the pages in the main memory 12 for pages for which the corresponding status flag is on. In other words, the main memory storage unit 16 searches for pages whose memory contents have been changed (a dirty page) after an execution of the preceding snapshot dump, i.e., an execution of the (g−1)th snapshot. Here, only pages Pi and Pj are assumed to have been changed after an execution of the preceding snapshot dump. In this case, only the status flags for pages Pi and Pj are in an on state as shown in FIG. 1. Referring to the status flag being on, the main memory storage unit 16 finds out the dirty pages Pi and Pj.

After having found the dirty pages Pi and Pj, the main memory storage unit 16 first secures a new area Si in the main memory storage area 13 to store the memory contents Mi of page Pi. Then, the main memory storage unit 16 takes out the memory contents Mi from the main memory 12 and stores them in the storage area Si. Next, the main memory storage unit 16 places (cancels) the status flag for page Pi in the main memory 12 in an off state. Furthermore, the main memory storage unit 16 stores location data Ni (e.g., the beginning address) indicating the location of storage area Si in area Ti on the storage location list 14. Area Ti is an area corresponding to page Pi. The main memory storage unit 16 also performs the same process on page Pj as on page Pi. Specifically, after having area Sj in the main memory storage area 13, the main memory storage unit 16 takes out the memory contents Mj of page Pj from the main memory 12 and stores them in area Sj. After turning off the status flag of page Pj in the main memory 12, the main memory storage unit 16 stores location data Nj of area Sj in area Tj on the storage location list 14.

After the contents of all the dirty pages have been stored in this way, that is, after the pages whose status flag is on have disappeared from the main memory 12, the main memory storage unit 16 stores the memory contents of the storage location list 14 at that time directly in the g-th entry of the storage location list storage area 15. The g-th entry is secured for the g-th snapshot dump.

The status flag may be canceled (turned off) each time the memory contents of a dirty page are stored as mentioned above. The status flags may be turned off in unison after the memory contents of all the dirty pages have been stored.

Explained next will be the operation of restoring the memory contents stored in the execution of the snapshot dumps in the first embodiment.

A case where the memory contents stored in the execution of the g-th snapshot dump is restored will be considered. First, the main memory restoration unit 17 is started. In the storage location list storage area 15, as many storage location lists as the number of execution of the snapshot dumps until now are stored. Each storage location list is assigned a snapshot dump number. The main memory restoration unit 17 searches the columns of storage location lists stored in the storage location list storage area 15 for the g-th storage location list. The main memory restoration unit 17 refers to location data items Ni and Nj stored respectively in areas Ti and Tj in the g-th storage location list searched for. Location data items Ni and Nj indicate the storage locations where the memory contents are stored in the main memory storage area 13. Here, the memory contents are those stored at the time of the g-th snapshot. The main memory restoration unit 17 takes out the corresponding memory contents Pi and Pj on the basis of location data items Ni and Nj, and writes them in the pages Pi and Pj in the main memory 12.

The above is explained the operation of restoring the stored memory contents into the main memory 12 during the execution of the g-th snapshot dump, However, in the case that, directly after execution of the g-th snapshot dump, the running state of the program on the point where the (g−7)th snapshot dump has been executed are required to be restored and the execution of the program is also required to be restarted, it is of course that each of the stored memory contents during execution from the g-th snapshot dump to the (g−7)th snapshot dump are required to be orderly restored in the main memory 12.

As described above, with the first embodiment, when a snapshot dump is executed, only the memory contents of the pages which have changed from what were in the execution of the preceding snapshot dump are stored in the main memory storage area 13, and the storage location data on the corresponding pages in the storage location list is registered. Then, after the memory contents of all the pages that have undergone changes have been stored in the main memory storage area 13, the memory contents of the storage location list 14 are stored in the storage location list storage area 15.

When the memory contents are restored, location data indicating the storage location of the memory contents of each page is obtained on the basis of the stored storage location list. Then, on the basis of the obtained location data, the stored page contents are restored on the corresponding page in the main memory 12.

Hereinafter, a second embodiment of the present invention will be explained.

FIG. 2 shows the structure of a data processing system for executing snapshot dumps according to a second embodiment of the present invention.

As shown in FIG. 2, a data processing system for executing snapshot dumps 2 contains a processor 21, a main memory 22, and a cache memory 23. The processor 21 executes various programs. The main memory 22 is used to store the programs to be executed by the processor 21. The main memory 22 has a similar structure to that of the main memory 12 of FIG. 1 explained in the first embodiment. The cache memory 23 stores a copy of part of the contents of the main memory 22.

The cache memory 23 is a write-through cache memory, for example. The memory contents of the cache memory 23 is managed in blocks. Each block (cache block) stores a copy of a specific-sized memory contents of the main memory 22. In the second embodiment, to make the structure easy to understand, the size of each block is assumed to be the same as the size of each page in the main memory 22. In this case, the address given to each page in the main memory 22 is also give to the corresponding block in the cache memory 23. Therefore, in each block of the cache memory 23, a set of the address and the memory contents of the main memory 22 is stored. Furthermore, each block of the cache memory 23 is assigned a status flag. The status flag indicates whether or not the corresponding block is valid. When the status flag indicates V (valid), this means that the block is valid. When the status flag indicates I (invalid), this means that the block is invalid.

The data processing system for executing snapshot dumps 2 contains a main memory storage area 24 and an address storage area 25. The main memory storage area 24 and address storage area 25 are stored in an external nonvolatile memory device (e.g., a hard disk drive).

The main memory storage area 24 stores, for each snapshot dump execution, the memory contents that have been changed in the main memory 22 during the time between the preceding snapshot dump execution and the current snapshot dump execution. The address storage area 25 stores the addresses (valid addresses) corresponding to the valid blocks in the cache memory 23. The address storage area 25 contains an address table 251 and a retrieval table 252. The address table 251 has a plurality of entries for holding valid addresses. The retrieval table 252 retains data on the locations of entries (the beginning locations) in the address table 251 in which the valid address for each snapshot dump execution is stored. Namely, the retrieval table 252 indicates where the valid address for each snapshot dump execution is stored in the address table 251.

The data processing system for executing snapshot dumps 2 further contains a main memory storage unit 26, a main memory restoration unit 27, a cache address storage unit 28, and a cache restoration unit 29. The main memory storage unit 26 stores the contents of the main memory 12 in the main memory storage area 24. The main memory restoration unit 27 restores the memory contents stored in the main memory storage area 24 into the main memory 22. The cache address storage unit 28 stores the address of the valid block (valid address) in the cache memory 23 into the address storage area 25. The cache restoration unit 29 takes out the valid address stored in the address storage area 25 and also takes out the corresponding memory contents in the main memory 22. The cache restoration unit 29 restores the memory contents corresponding to the taken-out valid address into the cache memory 23.

The data processing system for executing snapshot dumps 2 further contains similar structures (not shown in FIG. 2) to the storage location list 14 and storage location list storage area 15 in the first embodiment, in addition to the above-described structure.

Explained next will be the operation of executing snapshot dumps in the second embodiment.

A case where the g-th snapshot dump is executed will be considered. Since the cache memory 23 is a write-through cache memory, when the memory contents in the cache memory 23 are updated, then the corresponding memory contents in the main memory 22 are also updated. This enables the memory contents in the cache memory 23 to match with the memory contents in the main memory 22. For example, the memory contents Cm and Cn of blocks Bm and Bn in the cache memory 23 agree with the memory contents of pages Pm and Pn in the main memory 22. In this case, the memory contents Cm on both sides are caused to correspond to one another via address Am. Similarly, the memory contents Cn on both sides are caused to correspond to one another via address An. Here, it is assumed that in the cache memory 23, only block Bm and block Bn are valid, and the other blocks are invalid.

When a snapshot dump is executed, the cache address storage unit 28 is started. The address storage unit 28 searches the blocks in the cache memory 23 for valid blocks whose status flag is set in a valid state. Having found out two valid blocks Bm and Bn, the cache address storage unit 28 stores the valid address Am corresponding to block Bm and the valid address An corresponding to block Bn in sequence in the address storage area 25.

More specifically, as shown in FIG. 3, the cache address storage unit 28 stores valid addresses Am and An in specified locations in the address table 251 on the basis of the entry location data stored in entry g in the retrieval table 252 of the address storage area 25. Entry g is provided for the g-th snapshot dump. Entry location data in entry g indicates the location of entry (the beginning location) in the address table 251 that is to store the valid address for the g-th snapshot dump. For example, when the entry location data in entry g indicates the beginning location of entry E1, valid address Am is first stored in entry E1 in the address table 251. Then, for example, valid address An is stored in entry E2 next to entry E1. In this way, after the addresses of all the valid blocks have been stored, the cache address storage unit 28 sets entry location data indicating the location of entry (the beginning location) in the address table 251 that is to store the valid address for the next (g+1)th snapshot dump, in entry g+1 of the retrieval table 252 in preparation for processing the next (i.e., the (g+1)th) snapshot dump. For example, entry location data indicating the beginning location of entry E3 is set in entry g+1. At the time of execution of the next (g+1)th snapshot dump, the valid address will be stored in entry E3 or later. As seen from the above explanation, the entry location data in entry g is what has been set in execution of the previous (g−1)th snapshot dump.

When a snapshot dump is executed, the main memory storage unit 26 is also started. The main memory storage unit 26 operates in the same way as the main memory storage unit 16 of the first embodiment does. Specifically, the main memory storage unit 26 searches the pages in the main memory 22 for pages whose memory contents have been changed after the execution of the preceding snapshot dump (i.e., dirty pages). In the second embodiment, the page size is assumed to be equal to the block size. Therefore, dirty pages are Pm and Pn in the main memory 22. Then, the main memory storage unit 26 stores the memory contents Cm and Cn of the dirty pages Pm and Pn in the main memory storage area 24. In this case, the memory contents Cm and Cn are orderly stored in accordance with an address secured for the g-th snapshot dump in the main memory storage area 24. As in the first embodiment, in the second embodiment, a storage location list (not shown) indicating the storage locations of the memory contents Cm and Cn is used.

While in the second embodiment, the invention is applied to the case where the page size is equal to the block size, it may be applied to the case where the page size is larger than the block size, which is actually found more often under usual conditions. When the block size is larger than the page size, the invention can be applied by causing a single block to correspond to a plurality of pages.

Explained next will be the operation of restoring the memory contents stored in the execution of the snapshot dumps in the second embodiment.

A case where the memory contents stored in the execution of the g-th snapshot dump is restored will be considered. Whether or not the same block as in storage is used in restoration depends on the type of cache memory. When the cache memory is of the direct mapped type, the location of the block in restoration is equal to that in storage, whereas it is of the set associative type or fully associative type, the block location in restoration can differ from that in storage. To simplify an explanation of the restoration process, the cache memory 23 is assumed to be of the direct mapped type.

When the memory contents stored in the execution of the snapshot dump is restored, the main memory restoration unit 27 and cache restoration unit 29 are started. The main memory restoration unit 27 restores the g-th memory contents stored in the main memory storage area 24 in the main memory 22 as the main memory restoration unit 17 does in the first embodiment. In this case, on page Pm, memory contents Cm with address Am are restored, and on page Pn, memory contents Cn with address An are restored.

The cache restoration unit 29 first brings the status flags for all the cache blocks in the cache memory 23 into an invalid state. Then, the cache restoration unit 29 refers to the retrieval table 252 in the address storage area 25. Namely, the cache restoration unit 29 obtains the entry location data stored in entry g of FIG. 3. Here, entry g corresponds to the g-th snapshot dump. The entry location data is assumed to indicate the beginning location of entry E1. The cache restoration unit 29 takes out address Am stored in entry E1 in the address table 251 on the basis of the obtained entry data. Then, the cache restoration unit 29 secures block Bm in the cache memory 23 on the basis of taken-out address Am, and places the status flag of block Bm in a valid state. At the same time, the cache restoration unit 29 takes out memory contents Cm restored in the main memory 22 on the basis of the taken-out address Am, and writes address Am and memory contents Cm in the secured block Bm. Next, the cache restoration unit 29 takes out address An stored in entry E2 (the entry next to entry E1) in the table 251. Then, the cache restoration unit 29 secures block Bn in the cache memory 23 on the basis of the taken-out address An, and places the status flag of block Bn in a valid state. At the same time, the cache restoration unit 29 takes out memory contents Cn restored in the main memory 22 on the basis of the taken-out address An, and writes address An and memory contents Cm in the secured block Bm.

Entry E3 in the address table 251 is managed as an entry related to the next (g+1)th snapshot dump by entry g+1 in the retrieval table 252. For this reason, entry E3 is not restored in the g-th snapshot.

As described above, with the second embodiment, when a snapshot dump is executed, the memory contents of the main memory 22 are stored and the addresses of the valid blocks in the cache memory 23 are also stored. At the time of restoring memory contents stored in execution of the snapshot dumps, the stored contents of the main memory 22 are first restored in the main memory 22. Next, the addresses of the stored blocks are taken out. On the taken-out addresses, the corresponding memory contents are restored into the blocks in the cache memory.

Figure 4:
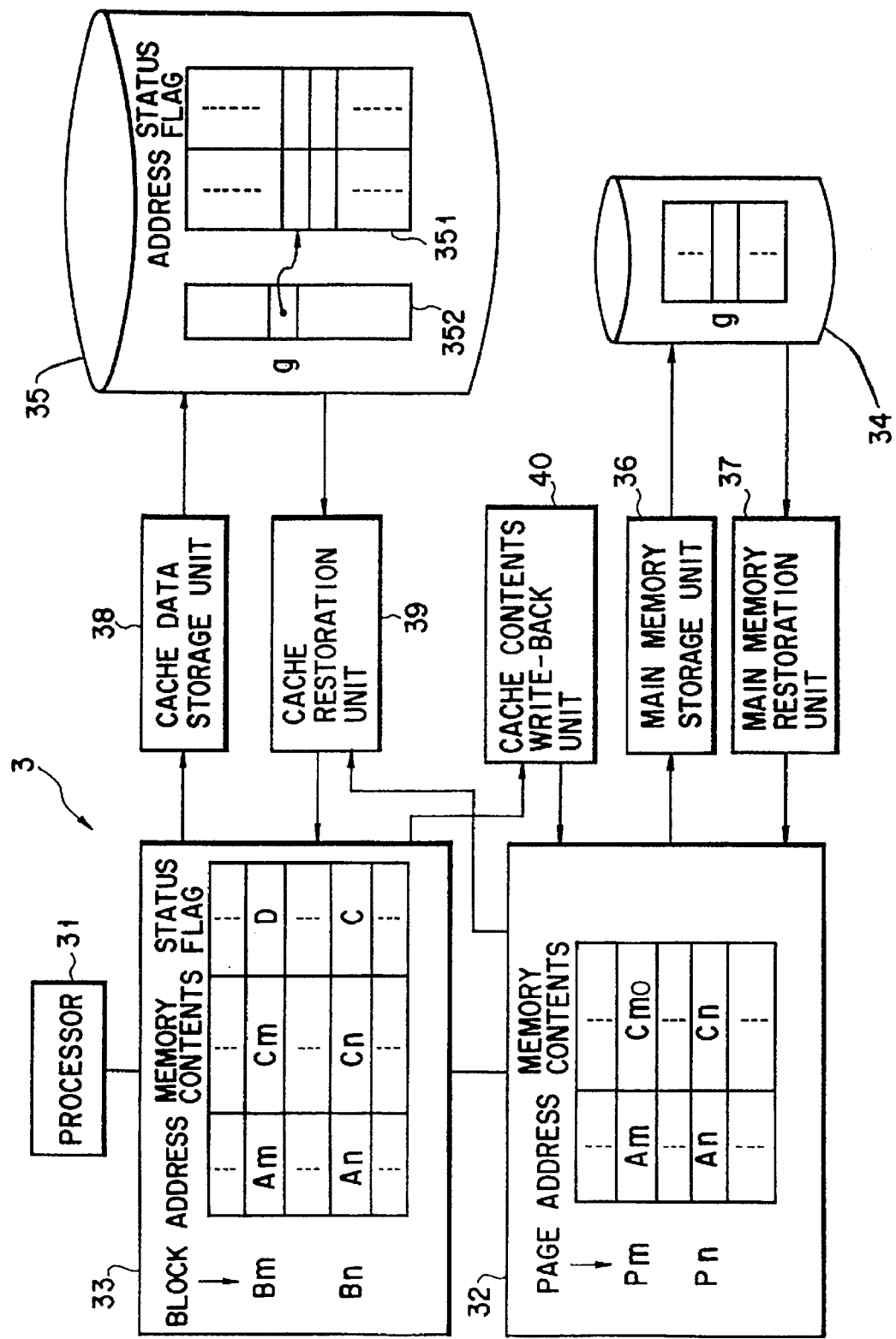
FIG. 4 is a block diagram of a data processing system for executing snapshot dumps according to a third embodiment of the present invention.

FIG. 4 shows the structure of a data processing system for executing snapshot dumps according to a third embodiment of the present invention.

As shown in FIG. 4, a data processing system for executing snapshot dumps 3 contains a processor 31, a main memory 32, and a cache memory 33. The processor 31 executes various programs. The main memory 32 is used to store the programs to be executed by the processor 31. The main memory 32 has a similar structure to that of the main memory 12 of FIG. 1 explained in the first embodiment. The cache memory 33 stores a copy of part of the contents of the main memory 32.

The cache memory 33 is a copy-back cache memory, for example, and is composed of blocks containing addresses, memory contents, and status flags, as is the write-through cache memory 23 of FIG. 2 in the second embodiment. The memory contents of the copy-back cache memory is not necessarily the same as the memory contents in the main memory 32 specified by the address. The status flag differs from that for the cache memory 23 of FIG. 2 explained in the second embodiment. Specifically, the status flag indicates not only whether or not the corresponding block is valid, but also whether or not the memory contents are equal to the corresponding memory contents in the main memory 32 when the block is valid. Here, a status flag indicating that both of the memory contents agree with each other is expressed by C (clean). A status flag indicating that they disagree with each other is indicated by D (dirty). Therefore, in the third embodiment, two letters C (clean) and D (dirty) are used in expression in place of V (valid) in the second embodiment. Furthermore, a status flag indicating that the block is invalid is expressed by I (invalid).

To simplify explanation, the block size of the cache memory 33 is assumed to be equal to the page size of the main memory 32. It is also assumed that, in the cache memory 33, block Bm storing a copy of memory contents Cm of page Pm in the main memory 32 specified by address Am is dirty, block Bn storing the contents Cn corresponding to the memory contents of the block (page) in the main memory 32 specified by address (page address) An is clean, and the other blocks are invalid (in FIG. 4, the invalid blocks are not shown). The memory contents Cm of the dirty block Bm disagree with the corresponding memory contents Cm0 in the main memory 32. The reason for the disagreement is that the old memory contents still remain in the main memory 32 without being updated. In contrast, the memory contents Cn in the clean block Bn agree with the corresponding memory contents Cn in the main memory 12.

The data processing system for executing snapshot dumps 3 contains a main memory storage area 34 and a cache data storage area 35. The main memory storage area 34 and the cache storage area 35 are stored in an external nonvolatile memory device (e.g., a hard disk drive). The main memory storage area 34 is used to store the contents of the main memory 32. The cache data storage area 35 is used to store sets of address and status flag in the valid blocks in the cache memory 33. The main memory storage area 34 has the same structure as that of the main memory storage area 13 of FIG. 1 explained in the first embodiment. The cache data storage area 35 contains an information table 351 consisting of entry groups that retain the address and status flag for each snapshot, and a retrieval table 352 holding entry location data (the beginning location) on the address table 351 for each snapshot.

The data processing system for executing snapshot dumps 3 further contains a main memory storage unit 36 and a main memory restoration unit 37. The main memory storage unit 36 stores the contents of the main memory 32 in the main memory storage area 34. The main memory restoration unit 37 restores the memory contents of the main memory 32 stored in the main memory storage area 34. The main memory storage unit 36 has the same structure as that of the main memory storage unit 16 of FIG. 1 explained in the first embodiment. Similarly, the main memory restoration unit 37 has the same structure as that of the main memory restoration unit 17.

The data processing system for executing snapshot dumps 3 further contains a cache data storage unit 38, a cache restoration unit 39, and a cache contents write-back unit 40. The cache data storage unit 38 stores sets of the address and status flag in the valid blocks stored in the cache memory 33 in the cache data storage area 35. The cache restoration unit 39 restores the block (address, memory contents, and status flag) in the cache memory 33 on the basis of the data in the cache data storage area 35 and the memory contents in the main memory 32. The cache contents write-back unit 40, when executing a snapshot dump, writes back the memory contents of the dirty blocks stored in the cache memory 33 into the main memory 32.

In addition to the above-described structure, the data processing system for executing snapshot dumps 3 contains structures similar to the storage location list 14 and storage location list storage area 15 of FIG. 1 explained in the first embodiment, which are not shown in FIG. 4.

Explained next will be the operation of executing snapshot dumps in the third embodiment.

A case where the g-th snapshot dump is executed will be considered. Since the cache memory 33 is a copy-back cache memory, when the memory contents in the cache memory 33 have been updated, the corresponding memory contents in the main memory 32 are not updated immediately. Namely, the block in the cache memory 33 can be in a dirty state (D state). In this way, the contents of the cache memory 33 is not necessarily equal to the contents of the main memory 32. The block becomes clean (C state) when the memory contents are written back into the main memory 32 by a copy-back mechanism (not shown) in a normal state where a snapshot dump is not executed.

When a snapshot dump is executed, the cache contents write-back unit 40 is started. The cache contents write-back unit 40 searches the blocks in the cache memory 33 for blocks whose status flag is set in a dirty (D) state, or dirty blocks. Here, only block Bm is assumed to be dirty.

In this case, the cache contents write-back unit 40 writes back the memory contents Cm of dirty block Bm into the main memory 32 on the basis of address Am in block Bm. This enables the updated correct memory contents Cm to be set in the page corresponding to address Am in the main memory 32, whereas the corresponding block Bm remains dirty. This is what is different from a normal write-back (copy-back) operation.

When a snapshot dump is executed, the cache data storage unit 38 is also started. The cache data storage unit 38 searches the blocks in the cache memory 33 for blocks whose status flag is set is a D or C state. Here, as shown in FIG. 4, only two blocks Bm and Bn are valid. In this case, the cache data storage unit 38 first stores a set of address Am and status flag D in the valid block Bm in the cache memory 33 into the information table 351 in the cache data storage area 35. Then, the cache data storage unit 38 stores a set of address An and status flag C in the valid block Bn in the cache memory 33 into the information table 351 in the cache data storage area 35.

More specifically, as shown in FIG. 5, the cache data storage unit 38 stores a set of address Am and status flag D in a specified location in the address table 351 on the basis of the entry location data stored in entry g in the retrieval table 352 of the cache data storage area 35. Entry g is provided for the g-th snapshot dump. The entry location data in entry g indicates the location of entry (the beginning location) in the information table 351 that is to store the valid address for the g-th snapshot dump. For example, when the entry location data in entry g indicates the beginning location of entry E1, a set of address Am and status flag D is first stored in entry E1 in the information table 351. Then, for example, a set of address An and status flag C is stored in entry E2 next to entry E1. In this way, after the addresses of all the valid blocks have been stored, the cache data storage unit 38 sets entry location data indicating the location of entry (the beginning location) in the information table 351 that is to store the valid address for the next (g+1)th snapshot dump, in entry g+1 of the retrieval table 352 in preparation for processing the next (i.e., the (g+1)th) snapshot dump. For example, entry location data indicating the beginning location of entry E3 is set in entry g+1. At the time of execution of the next (g+1)th snapshot dump, the valid address will be stored in entry E3 or later. As seen from the above explanation, the entry location data in entry g is what has been set in the previous (g−1)th snapshot.

After the cache contents write-back unit 40 has finished the writing-back operation, the main memory storage unit 36 is started. The main memory storage unit 36 searches the pages in the main memory 32 for pages whose contents have been changed after the execution of the preceding snapshot (that is, dirty pages), as the main memory storage unit 16 does in the first embodiment. The memory contents of the dirty pages are the memory contents Cn corresponding to the clean block Bn (where, it is assumed that the state of the block Bn has changed from dirty to clean after the preceding snapshot dump is executed) and the memory contents corresponding to the dirty block Bm (that is, the memory contents Cm just written back into the main memory 32 by the cache contents write-back unit 40) in the cache memory 33. Then, the main memory storage unit 36 stores the memory contents Cm and Cn of the dirty pages into the main memory storage area 34. In this case, memory contents Cm and Cn are stored in the area corresponding to the g-th snapshot dump in the main memory storage area 34. As in the first embodiment, in the second embodiment, a storage location list (not shown) indicating the storage locations for the memory contents Cm and Cn is used.

Explained next will be the operation of restoring the memory contents stored in the execution of the snapshot dumps in the third embodiment.

A case where the memory contents stored in the execution of the g-th snapshot dump is restored will be considered. First, the main memory restoration unit 37 and cache restoration unit 39 are started. The main memory restoration unit 37 restores the memory contents related to the g-th snapshot dump stored in the main memory storage area 34, as the main memory restoration unit 17 does in the first embodiment.

The cache restoration unit 39 brings the status flags of all the blocks in the cache memory 33 into an invalid (I) state. Then, the cache restoration unit 39 refers to the retrieval table 352 in the cache data storage area 35. Specifically, the cache restoration unit 39 obtains the entry location data stored in entry g as shown in FIG. 5. Here, entry g corresponds to the g-th snapshot dump. Entry location data is assumed to indicate the beginning location of entry E1. The cache restoration unit 39 takes out a set of address Am and status flag D stored in entry E1 in the information table 351 on the basis of the obtained entry storage data. Then, the cache restoration unit 39 secures block Bm in the cache memory 33 on the basis of the taken-out address Am, and places the status flag of block Bm in a dirty state. At the same time, the cache restoration unit 39 takes out the memory contents Cm restored in the main memory 32 on the basis of the taken-out address Am, and writes address Am and memory contents Cm in the secured block Bm. Next, the cache restoration unit 39 takes out a set of address An and status flag C stored in entry E2. Then, the cache restoration unit 39 secures block Bn in the cache memory 33 on the basis of the taken-out address An, and places the status flag of block Bn in a clear state. At the same time, the cache restoration unit 39 takes out the memory contents Cn restored in the main memory 32 on the basis of the taken-out address An, and writes address An and memory contents Cn in the secured block Bn.

As described above, with the third embodiment, when a snapshot dump is executed, the contents of the dirty block in the cache memory is written back into the main memory without changing its state, and the address and status flag in the dirty or clean valid block are stored. After data has been written back from the cache memory into the main memory, the contents of the main memory are stored. When the memory contents are restored in the cache memory 33, the contents of the main memory are first restored. The entry for the block is created on the basis of the address of the stored block, and the contents of the block are restored from the restored main memory. At this time, the status flag of the block is also restored.

Figure 6:
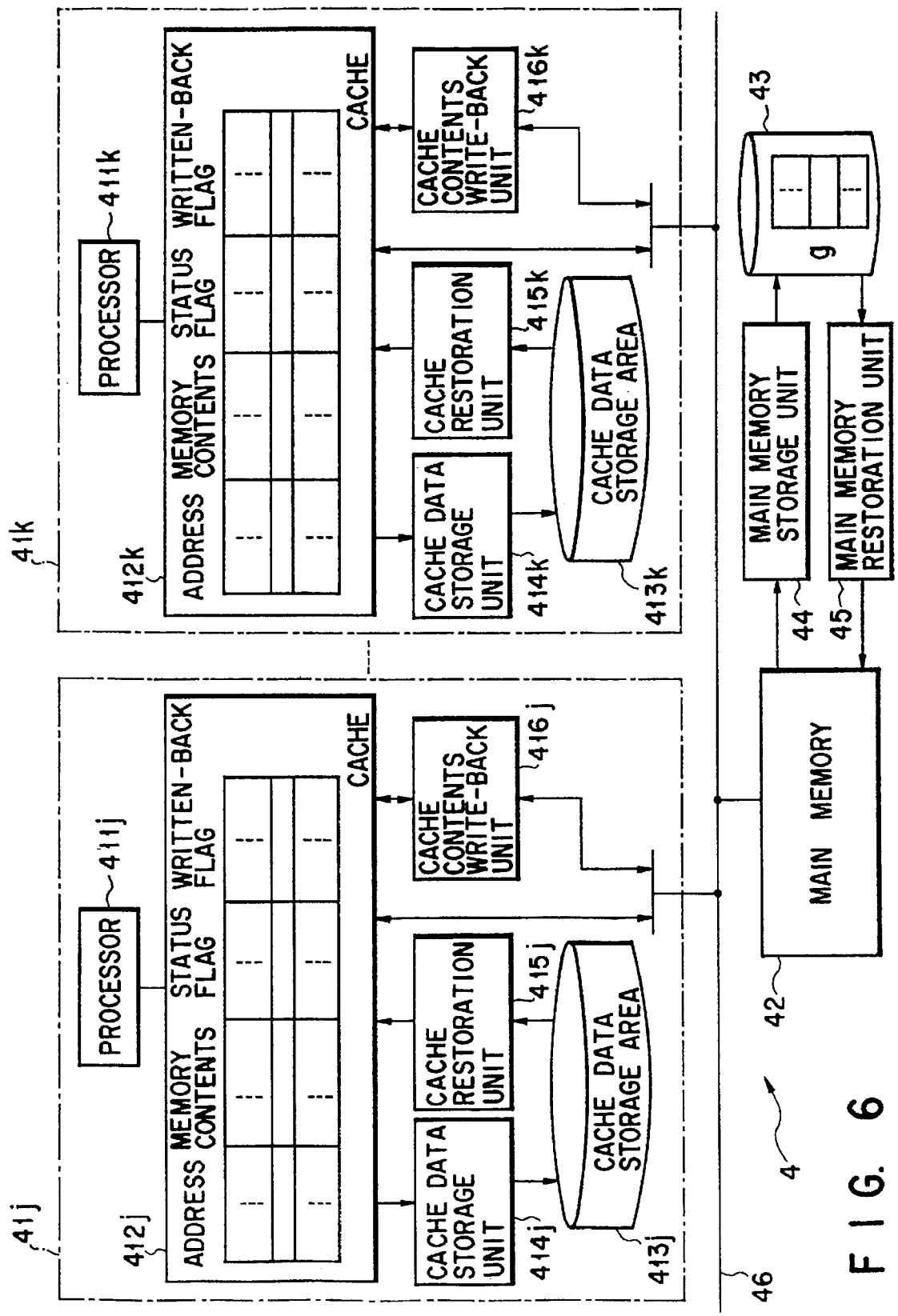
FIG. 6 is a block diagram of a data processing system for executing snapshot dumps according to a fourth embodiment of the present invention.

FIG. 6 shows the structure of a data processing system for executing snapshot dumps according to a fourth embodiment of the present invention.

As shown in FIG. 6, a data processing system for executing snapshot dumps 4 comprises a group of processing units, a main memory 42, a main memory storage area 43, a main memory storage unit 44, a main memory restoration unit 45, and a bus 46. The processing unit group contains processing units 41j and 41k and a plurality of processing units (not shown). The main memory 42 is shared by the processing unit group. The main memory storage area 43 is used to store the memory contents of the main memory 42. The main memory storage area 43 has a similar structure to that of the main memory storage area 13 of FIG. 1 explained in the first embodiment. The main memory storage unit 44 stores the memory contents of the main memory 42 in the main memory storage area 43. The main memory storage unit 44 has a similar structure to that of the main memory storage unit 16 of FIG. 1 explained in the first embodiment. The main memory restoration unit 45 restores the memory contents of the main memory 42 stored in the main memory storage area 43 to the main memory 42. The main restoration unit 45 has a similar structure to that of the main memory restoration unit 17 of FIG. 1 explained in the first embodiment. To a bus 46, the individual processing units and the main memory 42 are connected.

The processing units 41j and 41k contains processors 411j and 411k and cache memories 412j and 412k, respectively. The processors 411j and 411k execute various programs. The cache memories 412j and 412k hold copies of part of the contents of the main memory 42. The cache memories 412j and 412k contain a plurality of blocks consisting of sets of an address, memory contents, a status flag, and a written-back flag. The written-back flag indicates whether or not the memory contents of the corresponding block have been written back into the main memory 42 in executing a snapshot dump, in the form of an on and off state.

The processing units 41j and 41k further contain cache data storage areas 413j and 413k, cache data storage units 414j and 414k, cache restoration units 415j and 415k, and cache contents write-back units 416j and 416k, respectively. The cache data storage areas 413j and 413k are used to store sets of an address and a status flag in the valid blocks in the cache memories 412j and 412k. The cache data storage areas 413j and 413k have the same structure as that of the cache data storage area 35 of FIG. 4 explained in the third embodiment. The cache data storage units 414j and 414k store sets of an address and a status flag in the valid blocks held in the cache memories 412j and 412k into the cache data storage areas 413j and 413k. The cache restoration units 415j and 415k restore the contents of the cache memories 412j and 412k (the addresses, status flags, and memory contents of the blocks) on the basis of the data in the cache data storage areas 413j and 413k and the memory contents of the main memory 42.

In executing a snapshot dump, the cache contents write-back units 416j and 416k write back the memory contents of the dirty blocks which are stored in the cache memories 412j and 412k and in which no written-back flags have been set (which are in an off state), into the main memory 42 via the bus 46. The cache contents write-back units 416j and 416k monitor the behavior of the cache memories in the other processing units on the bus 46.

Although not shown in FIG. 6, the other processing units have the same structure as that of the processing units 41j and 41k. Furthermore, a data processing system for executing snapshot dumps 4 is provided with a mechanism (not shown) for keeping the contents of the respective cache memories including the cache memories 412j, 412k consistent with the contents of the main memory 42 on the basis of a known snooping-type cache coherency protocol. Although not shown in FIG. 6, in addition to the above structure, a data processing system for executing snapshot dumps 4 contains structures similar to the storage location list 14 and storage location list storage area 15 of FIG. 1 explained in the first embodiment.

Explained next will be the operation of executing snapshot dumps in the fourth embodiment.

A case where the g-th snapshot dump is executed will be considered. To simplify explanation, the block size is assumed to be equal to the page size.

As shown in FIGS. 7A and 7B, it is assumed that in cache memory 412j, block Bq holding address Aq and memory contents Cq is dirty (in state D) and the other blocks are invalid (in the figure, the invalid blocks are not shown). It is also assumed that in cache memory 412k, block Bp holding address Ap and memory contents Cp is clean (in state C) and the other blocks are invalid (in the figure, the invalid blocks are not shown). Furthermore, it is assumed that all the written back flags in blocks Bq and Bp are off.

When a snapshot dump is executed, the cache contents write-back units 416j and 416k in the respective processing units 412j and 412k are started. The cache contents write-back units 416j and 416k cancel the written-back flags (places the written-back flags in an off state) of all the blocks in the cache memories 412j and 412k. The cancellation may be performed on all the blocks including the blocks whose written-back flags have been already canceled. The cancellation may be selectively performed on only the blocks whose written-back flags are in an on state.

Then, the cache contents write-back units 416j, 416k search the blocks in the cache memories 412j, 412k for valid blocks whose status flags are set in state D and whose written flags are not set, that is, blocks whose cache states are dirty and whose written-back flags are in an off state. In this example, in cache memory 412j, only block Bq meets these conditions, whereas in cache memory 412k, no block meets these conditions. In this case, only the cache contents write-back unit 416j writes back the memory contents Cq of the dirty block Bq whose written-back flag is in an off state, into the main memory 42 via the bus 46 without changing the state of the block Bq (the status flag indicating the cache state) on the basis of address Aq in the block Bq. At this time, the cache contents write-back unit 416j sets the written-back flag of the block Bq in an on state (FIGS. 7A and 7B).

The cache contents write-back units in the processing units including the cache contents write-back units 416j, 416k monitor the behavior of the cache memories in another processing unit on the bus 46 in executing a snapshot dump. For example, the cache contents write-back units 416j, 416k monitor whether or not another processing unit updates the main memory 42 on the basis of the same addresses as those in the blocks stored in the cache memories 412j, 412k in their own processing units 41j, 41k, that is, whether or not the main memory update operation in another processing unit hits the cache memories 412j, 412k in their own units. When the main memory update operation in another processing unit hits the blocks corresponding to the cache memories 412j, 412k in their own units, the cache contents write-back units 416j, 416k places the written-back flags in the blocks in an on state. In the example, since the block Bq written back into the main memory 42 by the cache contents write-back unit 416j has not been stored in the cache memory in another processing unit, the written-back flag in any other processing unit is not turned on.

As a result, the updated correct memory contents Cq are set on the page corresponding to address Aq in the main memory 42, while the corresponding block Bq in the cache memory 412j remains dirty.

Then, the cache data storage units 414j, 414k are started. The cache data storage units 414j, 414k perform a cache data storage process as the cache data storage unit 38 of FIG. 4 does in the third embodiment. Specifically, the cache data storage unit 414j stores a set of address Aq and status flag D in the valid block Bq in the cache memory 412j into the cache data storage area 413j. The cache data storage unit 414k stores a set of address Ap and status flag C in the valid block Bp in the cache memory 412k into the cache data storage area 413k. In this case, as shown in FIG. 7C, the cache data storage unit 414j stores a set of address Aq and status flag D in a specific location in the information table 417j on the basis of the entry location data stored in entry g in the retrieval table 418j. Similarly, as shown in FIG. 7D, the cache data storage unit 414k stores a set of address Ap and status flag C in a specific location in the information table 417k on the basis of the entry location data stored in entry g in the retrieval table 418k. Here, each entry g is provided for the g-th snapshot.

When the cache data storage units 414j, 414k are started, the main storage unit 44 is also started. The main memory storage unit 44 searches the pages in the main memory 42 for pages whose contents have been changed after the preceding snapshot (i.e., dirty pages), as the main memory storage unit 16 does in the first embodiment. The memory contents of the dirty pages are the memory contents corresponding to the dirty block Bq in the cache memory 412j (i.e., the memory contents Cq just written back into the main memory 42 by the cache contents write-back unit 416j) and the memory contents Cq corresponding to the clean block Bp in the cache memory 412k. It is assumed that the state of the block Bp has changed from dirty to clean after the preceding snapshot dump is executed. Then, the main memory storage unit 44 stores the memory contents Cq, Cp of the dirty pages into the area for the g-th snapshot dump in the main memory storage area 43.

What has been explained above is about the case where there is no common block between the cache memories in the individual units. In contrast, as shown in FIGS. 8A and 8B, for example, when block Bq exists not only in cache memory 412j but also in cache memory 412k, the operation during snapshot dump execution differs slightly as described below.

It is assumed that after having canceled the written-back flags of all the blocks in the cache memory 412j, the cache contents write-back unit 416j in the processing unit 41j has searched for block Bq whose status flag is dirty and whose written-back flag is in an off state. In this case, the cache contents write-back unit 416j writes back the memory contents Cq of the block B into the main memory 42 without changing the state of the block Bq on the basis of address Aq in the block Bq, and places the written-back flag of the block Bq in an on state (FIG. 9A).

When the cache contents write-back unit 416j has written back the contents into the main memory 42, the cache contents write-back unit 416k in the processing unit 41k senses on the basis of the address on the bus 46 that the written-back block Bq is also stored in the cache memory 412k in its own unit 41k. In this case, the cache contents write-back unit 416k places the written-back flag of the block Bq in the cache memory 412k in an on state (FIG. 9B). The flag setting is effected to prevent the cache contents write-back unit 416k from wastefully writing back the contents into the main memory 42 for the same block Bp as that written back into the main memory 42 by the cache contents write-back unit 416j. When the cache contents write-back unit 416k has written back the block Bq stored in the cache memory 412k in its own unit 41k earlier, the cache contents write-back unit 416j sets the written-back flag as the cache contents write-back unit 416j did as describe above. When the cache contents write-back units 416j, 416k attempt to write back block Bq at the same time, the unit that has gotten the bus 46 first may effect a process, or both units may effect the same process. The cache contents write-back unit itself that has written back the block does not necessarily have to place the written-back flag in an on state.

In the above case, the cache data storage process effected by the cache storage units 414j, 414k is as follows.

The cache data storage unit 414j stores a set of address Aq and status flag D in a specific location in the information table 417j on the basis of the entry location data stored in entry g in the retrieval table 418j, as shown in FIG. 9C. Similarly, the cache data storage unit 414k stores a set of address Ap and status flag C and a set of address Aq and status flag D in specific locations in the information table 417k on the basis of the entry location data stored in entry g in the retrieval table 418k, as shown in FIG. 9D.

Explained next will be the operation of restoring the memory contents stored in the execution of the snapshot dumps in the fourth embodiment.

A case where the memory contents stored in the execution of the g-th snapshot dump is restored will be considered. It is assumed that the insides of the cache memories 412j and 412k are as shown in FIGS. 7A and 7B, respectively.

First, the main memory restoration system 45 and the cache restoration units 415j, 415k are started. First, the main memory restoration unit 45 restores the memory contents related to the g-th snapshot dump, which are stored in the main memory storage area 43, into the main memory 42, as the main memory restoration unit 17 does in the first embodiment.

The cache restoration unit 415j operates in the same manner that the cache restoration unit 39 does in the third embodiment. Specifically, the cache restoration unit 415j obtains the entry location data stored in entry g, referring to the retrieval table 418j in the cache data storage area 413j, as shown in FIG. 7C. The entry location data is assumed to indicate the beginning location of entry E1. The cache restoration unit 415j takes out a set of address Aq and status D stored in entry E1 in the information table 417j on the basis of the obtained entry storage data. Then, the cache restoration unit 415j secures block Bq in the cache memory 412j on the basis of the taken-out address Aq, and places the status flag of block Bq in a dirty state. At the same time, the cache restoration unit 415j takes out the memory contents Cq restored in the main memory 42 on the basis of the taken-out address Aq, and writes address Aq and memory contents Cq in the secured block Bq. On the other hand, the cache restoration unit 415k obtains the entry location data stored in entry g, referring to the retrieval table 418k in the cache data storage area 413k, as shown in FIG. 7D. The cache restoration unit 415k takes out a set of address Ap and status flag C stored in entry E2 in the information table 417k on the basis of the obtained entry storage data. Then, the cache restoration unit 39 secures block Bp in the cache memory 412k on the basis of the taken-out address Ap, and places the status flag of block Bp in a clean state. At the same time, the cache restoration unit 415k takes out the memory contents Cp restored in the main memory 42 on the basis of the taken-out address Ap, and writes address Ap and memory contents Cp in the secured block Bp.

As explained above, with the fourth embodiment, when a snapshot dump is executed, the written-back flags of all the blocks in its own cache memory are canceled in each processing unit, and thereafter the contents of the dirty valid blocks whose written-back flags are off in its own cache memory are written back directly into the main memory. Furthermore, the writing back of another cache memory into the main memory is snooped. When the block equivalent to the block written back from another cache memory into the main memory is stored in its own cache memory, a written-back flag is set for the block. The flag setting prevents the contents written back from another cache memory into the main memory from being wastefully written back from the cache memory into the main memory again.

Furthermore, in each processing unit, the addresses and status flags in the dirty or clean valid blocks in its own cache memory are stored. After the writing back of the cache memory into the main memory in each processing unit, the contents of the main memory are stored.

When the memory contents are restored, the stored contents of the main memory are first restored. In each processing unit, an entry of the block is created on the basis of the address of the stored block, and the contents of the block are restored from the restored main memory. At this time, the status flag of the block is also restored.

Figure 10:
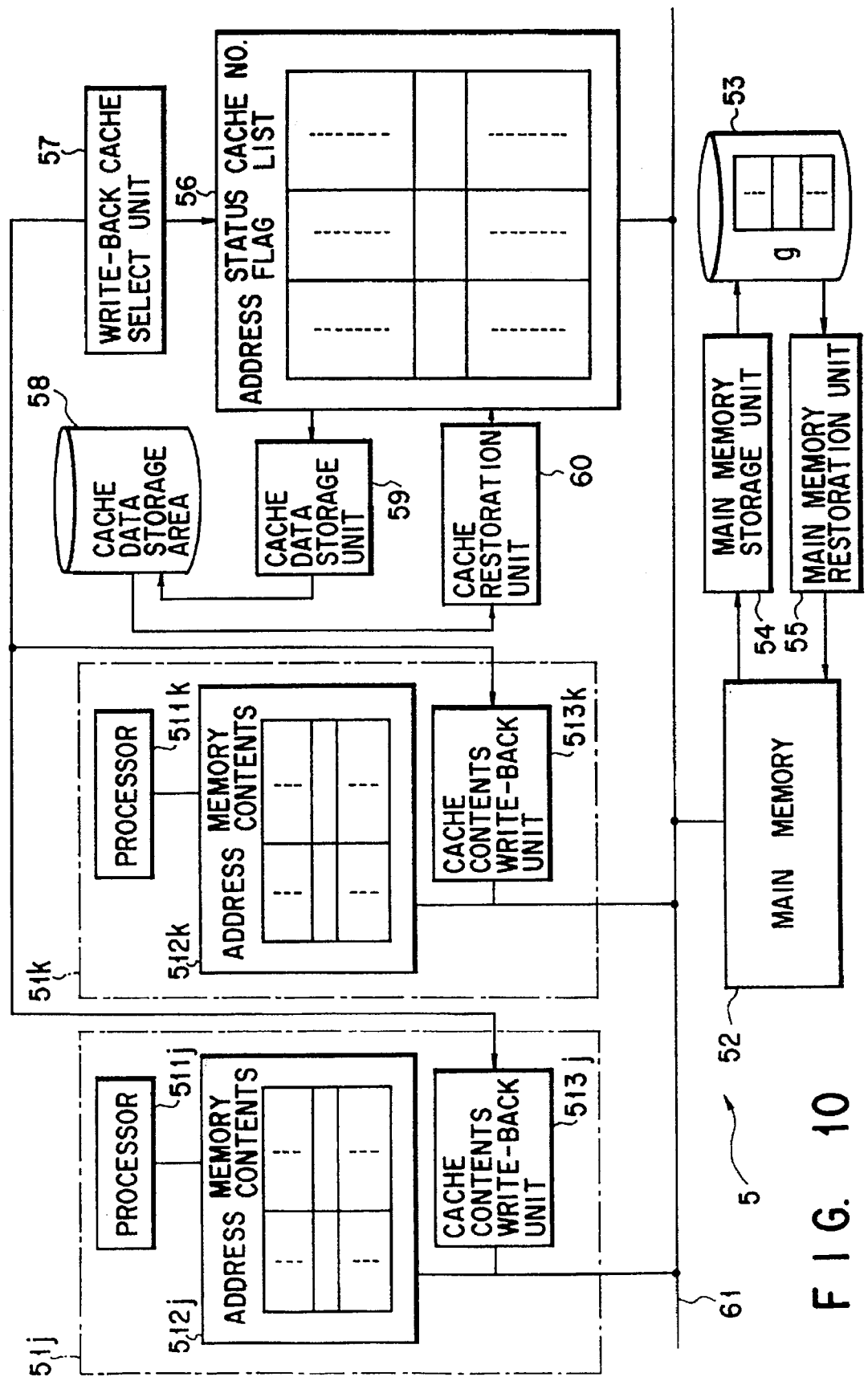
FIG. 10 is a block diagram of a data processing system for executing snapshot dumps according to a fifth embodiment of the present invention.

FIG. 10 shows the structure of a data processing system for executing snapshot dumps according to a fifth embodiment of the present invention.

As shown in FIG. 10, a data processing system for executing snapshot dumps 5 comprises a group of processing units, a main memory 52, a main memory storage area 53, a main memory storage unit 54, and a main memory restoration unit 55. The processing unit group contains processing units 51j and 51k and a plurality of processing units (not shown). The main memory 52 is shared by the processing unit group. The main memory storage area 53 is used to store the contents of the main memory 52. The main memory storage area 53 has a similar structure to that of the main memory storage area 13 of FIG. 1 explained in the first embodiment. The main memory storage unit 54 stores the memory contents of the main memory 52 in the main memory storage area 53. The main memory storage unit 54 has a similar structure to that of the main memory storage unit 16 of FIG. 1 explained in the first embodiment. The main memory restoration unit 55 restores the contents of the main memory 52 stored in the main memory storage area 53. The main restoration unit 55 has a similar structure to that of the main memory restoration unit 17 of FIG. 1 explained in the first embodiment.

The data processing system for executing snapshot dumps 5 further contains a directory 56 and a write-back cache select unit 57. The entries of the directory 56 hold sets of an address, a status flag, and a cache number in the blocks stored in the cache memory in each processing unit. The cache number indicates which cache memory stores the block. The cache select unit 57 selects a cache memory that should write back the contents into the main memory 52.

The data processing system for executing snapshot dumps 5 further contains a cache data storage area 58, a cache data storage unit 59, a cache restoration unit 60, and a bus 61. The cache data storage area 58 is used to store sets of an address, a status flag, and a cache number of the valid blocks in the cache memory in each processing unit. The cache data storage unit 59 stores sets of an address, a status flag, and a cache number in the valid entries stored into the directory 56. To the bus 61, each processing unit, the main memory 52, and the directory 56 are connected.

The processing units 51j and 51k contain processors 511j and 511k, cache memories 512j and 512k, and cache contents write-back units 513j and 513k, respectively. The processors 511j and 511k execute various programs. The cache memories 512j and 512k hold copies of part of the contents of the main memory 52.

In the data processing system for executing snapshot dumps 5, since a mechanism (not shown) keeps consistency according to an directory-based cache coherency protocol, the state of each cache memory including the cache memories 512j, 512k are managed logically at one place by the directory 56. The cache memories 512j, 512k contain blocks storing sets of an address and memory contents. The cache contents write-back units 513j, 513k are actuated by the cache select unit 57, and write back the memory contents of a given block stored in the cache memories 512j, 512k into the main memory 52 via the bus 61.

Although not shown in FIG. 10, the other processing units have the same structure as that of the processing units 51j, 51k. In addition to the above structure, The data processing system for executing snapshot dumps 5 contains structures similar to the storage location list 14 and the storage location area 15 of FIG. 1, which are not shown in FIG. 10.

Explained next will be the operation of executing snapshot dumps in the fifth embodiment.

A case where the g-th snapshot dump is executed will be considered. To simplify explanation, the block size is assumed to be equal to the page size.

The states of the insides of the cache memories 512j, 512k and the directory 56 are shown in FIGS. 11A, 11B, and 11C. Specifically, as shown in FIG. 11A, the cache memory 512j contains blocks Br and Bs holding addresses Ar and As and memory contents Cr and Cs, respectively. The cache memory 512k contains the same block as block Br in the cache memory 512j. As shown in FIG. 11B, the directory 56 contains entry Er and entry Es. In entry Er, the address Ar, status flag D, and cache numbers 512j, 512k of block Br are stored. The cache numbers 512j, 512k mean that address Ar stored in entry Er corresponds to the cache memories 512j, 512k. In this case, address Ar is stored in each block Br in the cache memories 512j, 512k. In entry Es, the address As, status flag C, and cache number 512j are stored. The cache number 512j means that address As stored in entry Es corresponds to the cache memory 512j. In this case, address As is stored in block Bs in the cache memory 512j.

When a snapshot dump is executed, the cache select unit 57 is started. To write back the memory contents of the dirty blocks existing in each cache memory into the main memory 52, the cache select unit 57 carries out a cache select operation described below.

First, referring to the directory 56 of FIG. 11C, the cache select unit 57 searches for an entry whose status flag is set in an dirty state. In the example of FIG. 11C, the status flag in entry Er in the directory 56 is dirty. The cache numbers in entry Er indicate 512j and 512k. Thus, the cache select unit 57 recognizes that the block corresponding to address Ar is contained in the cache memories 512j and 512k. Then, the cache select unit 57 selects one of the cache memories 512j and 512k. Here, the cache memory 512j is assumed to have been selected. When the cache number indicates only one cache memory, the cache memory is selected as a matter of course.

When selecting the cache memory 512j, the cache select unit 57 requests the corresponding cache contents write-back unit 513j (see FIG. 10) to write back the contents of block Br with address Ar into the main memory 52. Receiving this request, the cache contents write-back unit 513j writes back the memory contents Cr of block Br stored in the cache memory 512j into the main memory 52 on the basis of address Ar.

After what should be written back from the cache memory in each processing unit into the main memory has run out, the cache data storage unit 59 is started. The cache data storage unit 59 stores sets of an address, a status flag, and a cache number of the valid entries (whose status flag is in a dirty or clean state) in the g-th entry in the cache data storage area 58. Specifically, the cache data storage unit 59 stores a set of address Ar, status flag D, and cache numbers (512j, 512k) in the valid entry Er of the directory 56 shown in FIG.

11C into entry E1 in the information table 581 specified by the g-th entry in the retrieval table 582 in the cache data storage area 58. Then, the cache data storage unit 59 stores a set of address As, status flag C, and cache number 512j in the valid entry Es of the directory 56 shown in FIG. 11C into entry E2 next to entry E1 as shown in FIG. 11D.

When the cache data storage unit 59 is started, the main storage unit 54 is also started. The main memory storage unit 54 searches the pages in the main memory 52 for pages whose contents have been changed after the preceding snapshot (i.e., dirty pages), as the main memory storage unit 16 of FIG. 1 does in the first embodiment. The memory contents of the dirty pages are the memory contents Cs stored in the clean block Bs (where, it is assumed that the state of the block Bn has changed from dirty to clean after the preceding snapshot dump is executed) and the memory contents stored in the dirty block Br (i.e., the memory contents Cr just written back into the main memory 42 by the cache contents write-back unit 513j). Then, the main memory storage unit 54 stores the memory contents Cr, Cs of the dirty pages into the g-th entry in the main memory storage area 53.

Explained next will be the operation of restoring the memory contents stored in the execution of the snapshot dumps in the fifth embodiment.

A case where the memory contents stored in the execution of the g-th snapshot dump is restored will be considered. First, the main memory restoration unit 55 and cache restoration unit 60 are started. Next, the main memory restoration unit 55 restores the memory contents related to the g-th snapshot dump, which are stored in the main memory storage area 53, into the main memory 52, as the memory restoration unit 17 of FIG. 1 does in the first embodiment. The cache restoration unit 60 operates in the same manner that the cache restoration unit 39 of FIG. 4 does in the third embodiment. Specifically, referring to the g-th entry in the retrieval table 582 in the cache data storage area 58 of FIG. 11D, the cache restoration unit 60 takes out a set of address Ar, status flag D, and cache numbers (512j, 512k) stored in entry E1 in the information table 581. Then, the cache restoration unit 60 restores the corresponding entry Er into the directory 56. Next, the cache restoration unit 60 takes out a set of address As, status flag C, and cache number 512j stored in entry E2 next to entry E1. Then, the cache restoration unit 60 restores the corresponding entry Es into the directory 56.

Furthermore, the cache restoration unit 60 creates block Br with address Ar and block Bs with address As in the cache memory 512j on the basis of the contents restored in the directory 56, and restores the memory contents Cr, Cs from the main memory 52 into block Br and block Bs in the cache memory 512j.

Similarly, the cache restoration unit 60 creates block Br with address Ar in the cache memory 512k, and restores the memory content Cr from the main memory 52 into block Br in the cache memory 512k.

As explained above, with the fifth embodiment, when a snapshot dump is executed, the directory is referred to, and on the basis of the status flag and the cache list in the directory data, the cache memory for writing back a dirty valid block is selected for each block. This enables the contents of the block to be written back from the selected cache memory into the main memory without changing the contents of the block. Data on the dirty or clean valid blocks managed in the directory is stored. Furthermore, after the writing back of the cache memory into the main memory, the contents of the main memory are stored.

When the memory contents are restored, the stored main memory contents are restored. Then, the address, status flag, and cache number of the stored block are restored in the directory. By using the address and status flag in the valid directory data in the restored directory, the corresponding block is created in each cache memory indicated by the cache list in the directory data. Then, the contents of the block are restored from the restored main memory.

Until now, the first to fifth embodiments have been explained.

As explained in detail, with the present invention, only the memory contents changed in the main memory for each snapshot dump execution are stored in a memory medium and data indicating their locations are stored in a memory medium in the form of a list. When the memory contents are restored, the list is referred to. Small volume of memory contents is required to store during the execution of the snapshot dumps. This helps reduce the capacity of the memory medium and makes it possible to re-create, at high speed, the state of the program running at a given point in time.

Furthermore, with the present invention, in the main memory with a cache memory, writing back is done into the main memory without changing the state of the cache memory, and the address and status flag of the block are stored in the memory medium. This prevents the original behavior of the program from being changed. That is, the program restarting at a given point in time reliably re-creates the same process as the normal process executed before the restart.

As seen from what has been explained, with the present invention, part at a given point in time of the program is not simply restarted, but the program restarted at a given point in time reliably executes the same process as the normal process executed before the restart.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data processing system with a main memory that stores data in pages, comprising:

storage means for storing memory dumps of said main memory;

location list storage means for storing lists indicating locations of memory contents on said storage means; and means for executing snapshot dumps in a constant period including:

means for storing into said storage means memory contents of said main memory changed during the time between a preceding snapshot dump execution and a current snapshot dump execution, means for creating location lists indicating locations of the memory contents on said storage means, and means for storing the created location lists in said location list storage means.

2. A system according to claim 1, wherein each page of said main memory contains a status flag indicating whether or not its own memory content has changed.

3. A data processing system with a main memory that stores data in pages, comprising:

a write-through-type cache memory storing a copy of part of the main memory data in blocks and containing address data of the blocks in said main memory and status flags indicating whether its own block is valid or invalid;

first storage means for storing memory dumps of said main memory;

second storage means for storing memory dumps of said cache memory;

means for executing snapshot dumps in a constant period including:

means for storing into said first storage means memory contents of said main memory changed during the time between a preceding snapshot dump execution and a current snapshot dump execution, and means for storing into said second storage means the address data corresponding to valid ones of the blocks in said cache memory;

first restoring means for writing back into said main memory the memory contents stored in said first storage means; and second restoring means for, on the basis of the address data stored in said second storage means, writing back into said cache memory the memory contents corresponding to the address data among the memory contents written back into said main memory.

4. A data processing system with a main memory that stores data in pages, comprising:

a copy-back-type cache memory storing a copy of part of the main memory data in blocks and containing address data of the blocks in said main memory and status flags indicating whether its own block is clean, dirty, or invalid;

first storage means for storing memory dumps of said main memory;

second storage means for storing memory dumps of said cache memory;

means for executing snapshot dumps in a constant period including:

means for writing back into said main memory memory contents of the blocks containing status flags indicating a dirty state in said cache memory, without changing the dirty state indications of the status flags, means for storing into said second storage means the address data and the status flags contained in the blocks having status flags indicating a dirty or clean state in said cache memory, and means for storing into said first storage means memory contents of said main memory changed during the time between a preceding snapshot dump execution and a current snapshot dump execution;

first restoring means for writing back into said main memory the memory contents stored in said first storage means; and second restoring means for writing back into said cache memory the memory contents corresponding to the address data stored in said second storage means among the memory contents written back into said main memory, and the status flags stored in said second storage means.

5. A data processing system with a main memory that stores data in pages and a plurality of processors that share said main memory, comprising:

a plurality of snooping-type cache memories provided in each of said plurality of processors, storing a copy of part of the main memory data in blocks and containing address data of the blocks in said main memory, status flags indicating whether its own block is clean, dirty, or invalid, and writing-back status flags indicating whether or not memory contents of its own block has been written back into said main memory;

first storage means for storing memory dumps of said main memory;

second storage means for storing memory dumps of said cache memories;

means for executing snapshot dumps in a constant period including:

means for setting all of the writing-back status flags in said cache memories to a non-written-back state, means for writing back into said main memory the memory contents of the blocks containing writing-back status flags indicating the non-written-back state and a status flag indicating a dirty state in said cache memories, without changing the dirty state indications of the status flags, means for storing into said second storage means the address data corresponding to the blocks containing the status flags indicating a dirty or clean state, and the corresponding status flags of the blocks in said cache memories, and means for storing into said first storage means memory contents of said main memory changed during the time between a preceding snapshot dump execution and a current snapshot dump execution;

first restoring means for writing back into said main memory the memory contents stored in said first storage means; and second restoring means for writing back into said cache memories the memory contents corresponding to the address data stored in said second storage means among the memory contents written back into said main memory, and the corresponding status flags in said second storage means.

6. A data processing system with a main memory that stores data in pages and a plurality of processors that share said main memory, comprising:

a plurality of cache memories provided in each of said plurality of processors, storing a copy of part of the main memory data in blocks;

directory memory means, connected to said cache memories, for storing address data of the blocks in said main memory contained in each of said cache memories, status flags indicating whether its own block is clean, dirty, or invalid, and cache list data indicating cache memories containing the blocks;

first storage means for storing memory dumps of said main memory;

second storage means for storing memory dumps of said cache memories;

means for executing snapshot dumps in a constant period including:

means for, in reference to said directory memory means, writing back into said main memory the memory contents of the blocks containing a status flag indicating a dirty state in said cache memories, means for, in reference to said directory memory means, storing into said second storage means the address data corresponding to the blocks containing the status flags indicating a dirty or clean state, the corresponding status flags, and the cache list data, and means for storing into said first storage means memory contents of said main memory changed during the time between a preceding snapshot dump execution and a current snapshot dump execution;

first restoring means for writing back into said main memory the memory contents stored in said first storage means;

second restoring means for writing back into said directory memory means the address data, the status flags, and the cache list data stored in said second storage means; and third restoring means for, on the basis of the address data and the cache list data written back into said directory memory means, writing back into said cache memories designated by said cache list data the memory contents corresponding to the address data among the memory contents written back into said main memory, by said first restoring means.

7. In a data processing system with a main memory, a method for executing snapshot dumps of said main memory, comprising the steps of:

executing snapshot dumps in a constant period to retain memory contents of said main memory, including:

storing memory contents of said main memory changed after executing a preceding snapshot dump in connection with a number of the snapshot dump executions in which said memory contents are stored;

creating location lists indicating stored locations of the memory contents;

storing the created location lists; and writing back into said main memory the memory contents stored in connection with the number of the snapshot dump executions in which said memory contents are stored by referring to said stored location lists.

* * * * *